(12) United States Patent
Li

(10) Patent No.: US 10,696,343 B2
(45) Date of Patent: Jun. 30, 2020

(54) SIDE VIEW MIRROR ASSEMBLY FOR A BICYCLE

(71) Applicant: Tung-Lieh Li, Taichung (TW)

(72) Inventor: Tung-Lieh Li, Taichung (TW)

( * ) Notice: Subject to any disclaimer, the term of this patent is extended or adjusted under 35 U.S.C. 154(b) by 0 days.

(21) Appl. No.: 15/921,608

(22) Filed: Mar. 14, 2018

(65) Prior Publication Data

US 2019/0283830 A1    Sep. 19, 2019

(51) Int. Cl.
*B62J 29/00* (2006.01)
*G02B 7/182* (2006.01)

(52) U.S. Cl.
CPC .............. *B62J 29/00* (2013.01); *G02B 7/182* (2013.01)

(58) Field of Classification Search
USPC ................................................ 359/842, 882
See application file for complete search history.

(56) References Cited

U.S. PATENT DOCUMENTS

| 2003/0072093 A1* | 4/2003 | Preis ........................ B62J 29/00 |
| | | 359/842 |
| 2011/0024598 A1* | 2/2011 | Carnevali ................ B62J 29/00 |
| | | 248/482 |

FOREIGN PATENT DOCUMENTS

| EP | 0936135 A2 | 2/1999 |
| EP | 0936135 | 8/2000 |

* cited by examiner

*Primary Examiner* — Jennifer D. Carruth

(57) ABSTRACT

A side view mirror assembly includes a mirror unit connected to a plugging unit via a bar. The mirror unit includes a mirror located between a frame and a plate which is attached to the frame in a detachable manner. The plugging unit includes an expansible tube and external and internal end elements each of which includes a wedge. A nut is inserted in the internal end element. A threaded bolt is inserted in the external and internal end elements and the expansible tube and engaged with the nut. The threaded bolt is rotatable in a direction to remove the wedges from the expansible tube to allow the expansible tube to shrink to render the expansible tube easily insertable in a handlebar. The threaded bolt is rotatable in another direction to make the wedges abut against and expand the expansible tube to keep the expansible tube in the handlebar.

13 Claims, 18 Drawing Sheets

SIDE VIEW MIRROR ASSEMBLY FOR A BICYCLE

BACKGROUND OF INVENTION

1. Field of Invention

The present invention relates to a bicycle and, more particularly, to a side view mirror assembly for a bicycle.

2. Related Prior Art

As disclosed in EP 0936135, a conventional rear view mirror assembly includes a reflecting element or mirror 1, a support 2, a bracket 7 and an expansible tubular element 9. The mirror 1 is inserted in and connected to an end of the support 2, which is hollow. A cavity 3 is made in an opposite end of the support 2. A spherical protuberance 8 is formed at an end of the bracket 7. The spherical protuberance 8 is fitted in the cavity 3, thereby rotationally connecting the bracket 7 to the support 2. An opposite end of the bracket 7 is connected to an end of the expansible tubular element 9. The bracket 7 and the expansible tubular element 9 are made in one piece. A washer 10 is located against an opposite end of the expansible tubular element 9. A screw 18 is driven in the expansible tubular element 9, with an enlarged head of the screw 18 abutted against the washer 10. An external diameter of the expansible tubular element 9 gets larger as the screw 18 is driven deeper in the expansible tubular element 9. Finally, the expansible tubular element 9 is fitted in a handlebar 11.

The use of the conventional rear view mirror assembly is not without any problems. The mirror 1 is connected to the support 2 by adhesion. However, the mirror 1 could and might be broken in a traffic accident. With the mirror 1 broken, the entire rear view mirror assembly has to be replaced with a new rear view mirror assembly, and this is a waste.

Moreover, the expansible tubular element 9 is fitted in the handlebar 11 after the screw 18 is driven in the expansible tubular element 9 is fitted in a handlebar 11. On one hand, the expansible tubular element 9 could easily be detached from the handlebar 11 if the screw 18 is driven inadequately deep in the expansible tubular element 9. On the other hand, it would be difficult to fit the expansible tubular element 9 in the handlebar 11 in the first place if the screw 18 is driven excessively deep in the expansible tubular element 9. It is difficult and troublesome to drive the screw 18 properly deep in the expansible tubular element 9.

The present invention is therefore intended to obviate or at least alleviate the problems encountered in prior art.

SUMMARY OF INVENTION

It is the primary objective of the present invention to provide an inexpensive, convenient and reliable side view mirror assembly.

To achieve the foregoing objective, the side view mirror assembly including a mirror unit, a bar and a plugging unit. The mirror unit includes a frame, a mirror and a plate. The frame includes a front annular flange extending around an opening. The mirror is abutted against the annular flange and visible via the opening. The plate is attached to the frame in a detachable manner, thereby keeping the mirror in the frame. The frame or the plate includes a ball. The plugging unit includes an external end element, an internal end element, an expansible tube and an adjustment unit. Each of the external and internal end elements includes a wedge. The adjustment unit includes a nut and a threaded bolt. The nut is inserted in the internal end element. The threaded bolt is inserted in the external end element, the expansible tube and the internal end element and engaged with the nut. The threaded bolt is rotatable in a first sense of direction to remove the wedges from the expansible tube to allow the expansible tube to shrink to render the expansible tube easily insertable in a handlebar. The threaded bolt is rotatable in a second sense of direction to cause the wedges to abut against and expand the expansible tube to keep the expansible tube tightly in the handlebar. The bar includes a first end connected to the external end element and a second end for receiving the ball in a socket-and-ball manner.

In another aspect, the expansible tube includes two frictional elements movably connected to each other.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF PREFERRED EMBODIMENT

Figure 1:
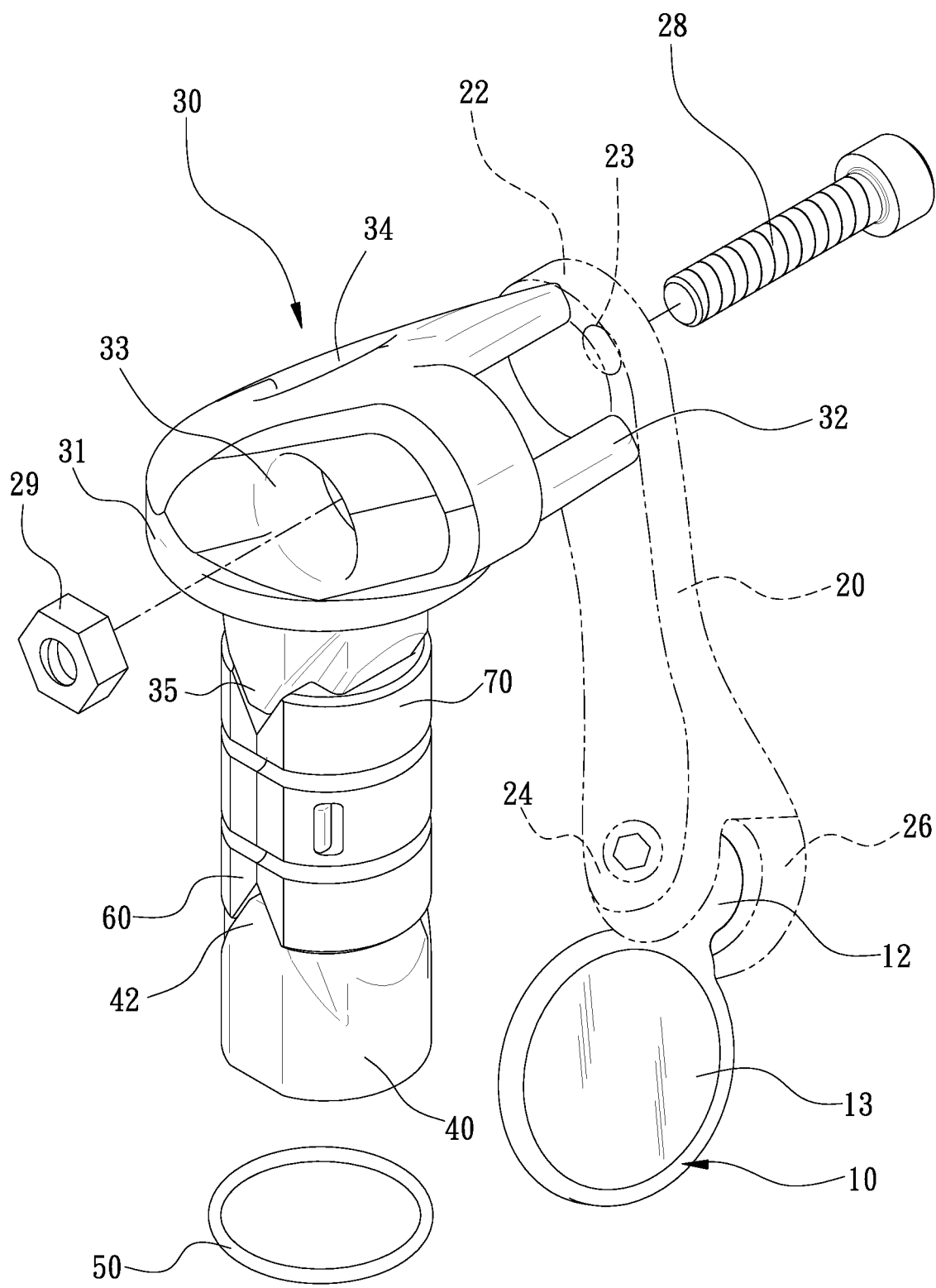
FIG. 1 is a perspective view of a rear view mirror assembly according to the first embodiment of the present invention.

Referring to FIG. 1, a side view mirror assembly includes a mirror unit 10, a bar 20 and a plugging unit 30 according to a first embodiment of the present invention. The mirror unit 10 is connected to the plugging unit 30 via the bar 20. The side view mirror assembly can be connected to a handle bar 56 (FIG. 3) by the plugging unit 30.

Referring to FIGS. 15 through 18, the side view mirror unit 10 includes a frame 11, a mirror 13 and a plate 15. The mirror 13 is kept in the frame 11 by the plate 15.

The frame 11 includes a ring 14, a front annular flange 142 formed along a front edge of the ring 14, a rear annular flange 144 formed along a rear edge of the ring 14, an annular groove 141 made between the front annular flange 142 and the rear annular flange 144, and an opening 143 made in the front annular flange 142. The ring 14 extends in a circular manner in the first embodiment. The frame 11 further includes a ball 12 formed on an external face of the ring 14. The frame 11 further includes a screw hole 18 made in a crescent portion (not numbered) of the front annular flange 142. The frame 11 further includes a recess 111 made in the rear annular flange 144 near the ball 12 so that the screw hole 18 is not covered by the rear annular flange 144.

Moreover, the mirror 13 is made of glass or polished metal. The mirror 13 includes a convex front face 131.

The plate 15 includes an edge 151, a lobe 152 extending from a section of the edge 151, and an arched fin 161 extending from an opposite section of the edge 151. The lobe 152 is shaped in compliance with the recess 111. A countersink hole 16 is made in the lobe 152 corresponding to the screw hole 18. The plate 15 further includes several ribs 153 to reinforce the strength thereof without adding much weight thereto.

The mirror 13 and the plate 15 are inserted in the annular groove 141. The plate 15 is located behind the mirror 13. A rear face of the arched fin 161 is abutted against a portion of a front face of the rear annular flange 144. The lobe 152 is inserted in the recess 111 and abutted against the crescent portion of the front annular flange 142. With the insertion of the lobe 152 in the recess 111, the countersink hole 16 is aligned with the screw hole 18. A screw 17 is inserted in the screw hole 18 through the countersink hole 16, thereby connecting the plate 15 to the frame 11 and keeping the mirror 13 in position.

A peripheral portion of the front face 131 of the mirror 13 is abutted against a rear face of the front annular flange 142, with a central portion of the front face 131 of the mirror 13 is visible via the opening 143. A rear face of the mirror 13 is abutted against the ribs 153 of the plate 15, thereby preventing the mirror 13 from shaking between the plate 15 and the frame 11.

Once broken, the mirror 13 can easily be replaced with a new one after the screw 17 is removed from the screw hole 18 and the plate 15 is detached from the frame 11. The replacement is easy, and the cost of using the rear view mirror assembly 10 is low.

Figure 17:
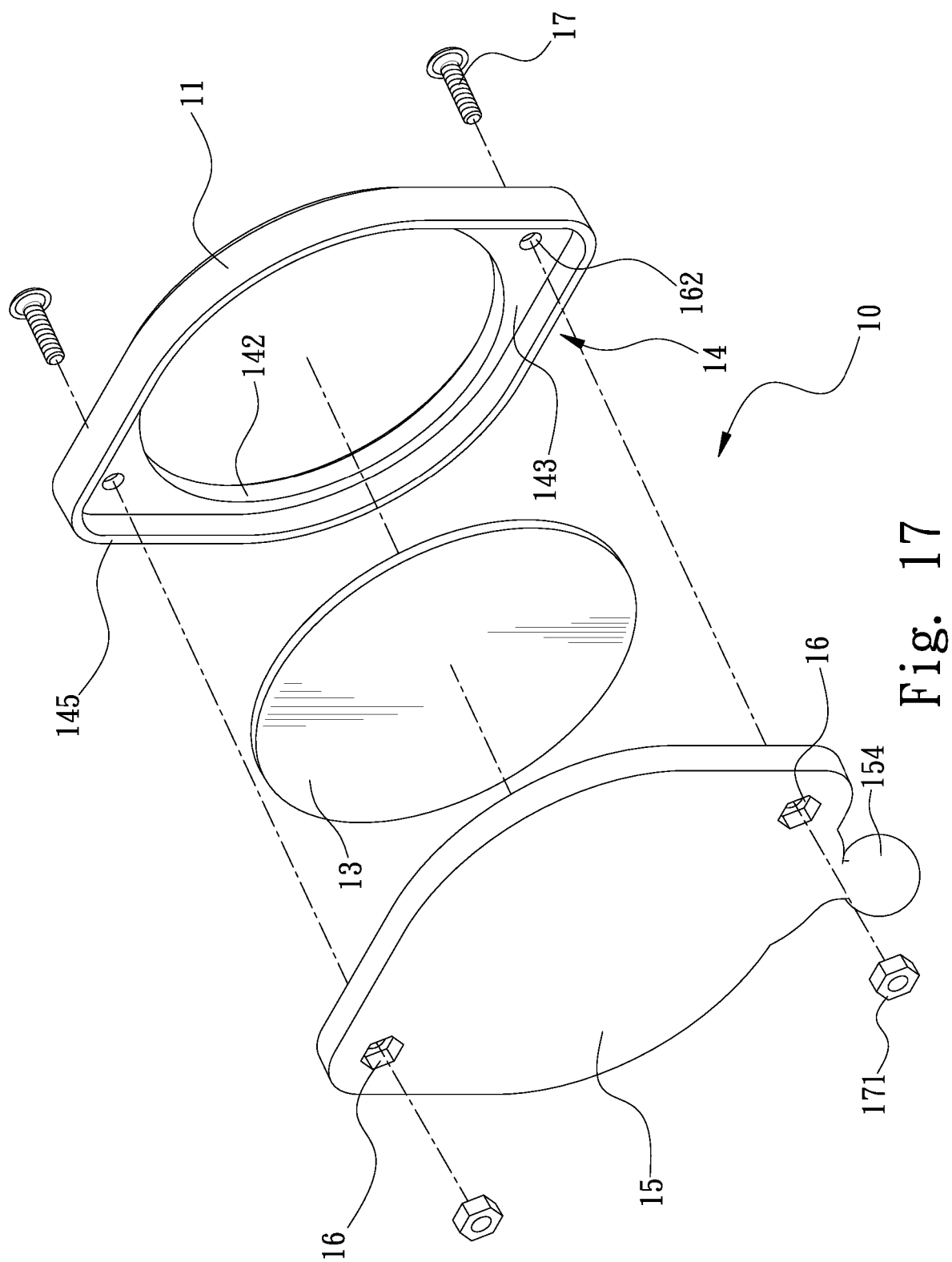
FIG. 17 is an exploded view of a mirror unit according to a second embodiment of the present invention.
Figure 18:
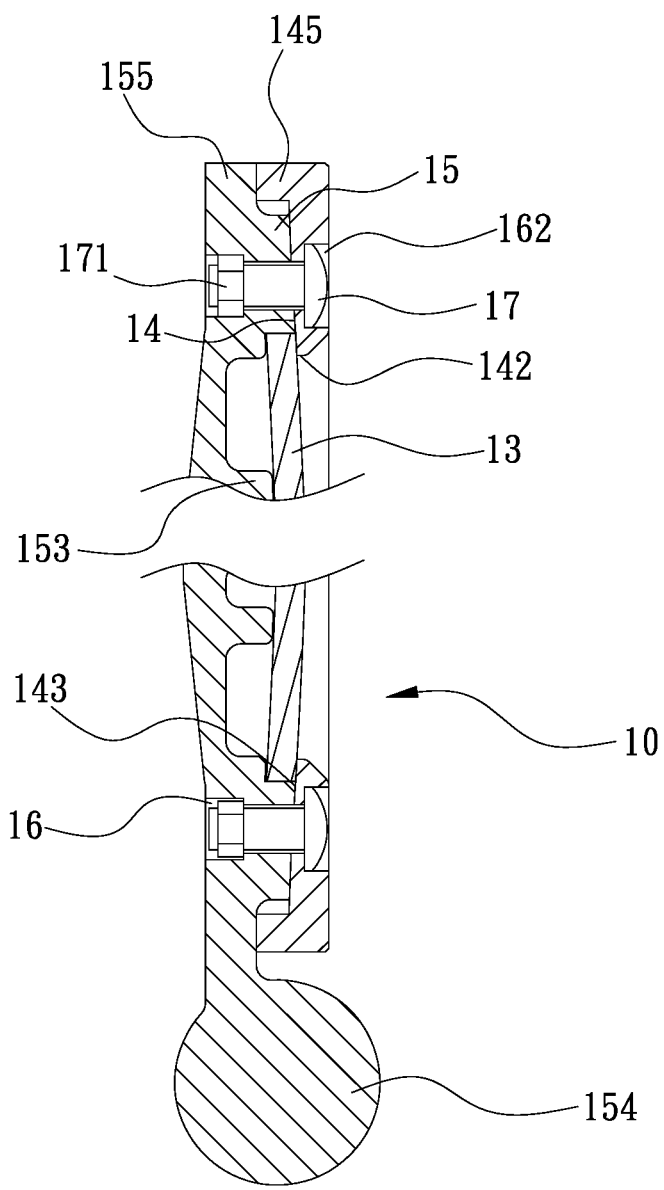
FIG. 18 is a cross-sectional view of the mirror unit shown in FIG. 17.

Referring to FIGS. 17 and 18, there is a mirror unit 10 according to a second embodiment of the present invention. The second embodiment is identical to the first embodiment except for several features. Firstly, the frame 11 is made in a different shape. In specific, instead of the circular ring 14, a substantially elliptic ring 145 is used. Accordingly, the front annular flange 142 is made in a different shape. Secondly, the rear annular flange 144 is omitted. Thirdly, the arched fin 161 is omitted. Fourthly, the screw hole 18 is omitted. Fifthly, two countersink holes 162 are made in the front annular flange 142. Sixthly, two countersink holes 16 are made in the plate 15, and each of the countersink holes 16 includes a hexagonal larger portion. Seventhly, two threaded bolts 17 and two nuts 171 are used. Each of the nuts 171 is inserted in the hexagonal portion of a corresponding one of the countersink holes 16. Each of threaded bolts 17 is inserted through a corresponding one of the countersink holes 162 and then engaged with a corresponding one of the nuts 171. Eighthly, the plate 15 includes an extensive portion 155 abutted against the ring 145. Ninthly, the ball 12 is omitted. Tenthly, a ball 154 is formed at the edge 151 of the plate 15.

Referring to FIG. 1, the bar 20 includes a first end 22, an opposite second end 24 and a jaw 26. The first end 22 of the bar 20 is made with a countersink hole 23. The second end 24 of the bar 20 includes a socket (not numbered), and so does the jaw 26. The ball 12 or 154 is located between the second end 24 of the bar 20 and the jaw 26 before the second end 24 of the bar 20 is connected to the jaw 26 by a threaded bolt (not numbered) engaged with a nut (not numbered). A portion of the ball 12 is inserted in the socket of the second end 24 of the bar 20 and another portion of the ball 12 is inserted in the socket of the jaw 26 to connect the mirror unit 10 to the bar 20 in a socket-and-ball manner so that the mirror unit 10 is rotatable relative to the bar 20.

Referring to FIG. 1, the plugging unit 30 includes an external end element 31, an internal end element 40 and two frictional elements 60 and 70. The external end element 31 is connected to the first end 22 of the bar 20. The frictional elements 60 and 70 are elastically connected to each other. The internal end element 40 is movable toward to the external end element 31 to push the frictional elements 60 and 70 away from each other.

Referring to FIGS. 1, 2, 4, 8, 9 and 10, the external end element 31 includes a connector 32 and a wedge 35. The connector 32 and the wedge 35 are made in one piece. The connector 32 is made with a countersink hole 33.

A nut 29 is non-rotationally inserted in the countersink hole 33. A threaded bolt 28 is inserted in the countersink holes 23 and 33. The threaded bolt 28 is engaged with the nut 29 to pivotally connect the bar 20 to the connector 32.

The wedge 35 is made with a countersink hole 34. The axis of the countersink hole 34 extends substantially perpendicular to the axis of the countersink hole 33. The wedge 35 includes a smaller end 35A and an opposite larger end 35B. The larger end 35B of the wedge 35 is connected to the connector 32. The wedge 35 includes two inclined grooves 36, a primary inclined face 37 and two secondary inclined faces 36A on each of two opposite sides thereof. On each side of the wedge 35, the primary inclined face 37 does not extend in a same plane with the secondary inclined faces 36A because of the inclined grooves 36. On each side of the wedge 35, the primary inclined face 37 extends between and parallel to the secondary inclined faces 36A.

Referring to FIGS. 1, 2, 4, 11 and 12, the internal end element 40 includes a wedge 42. The wedge 42 includes a smaller end 42A and an opposite larger end 42B. The wedge 42 includes two inclined grooves 43, a primary inclined face 44 and two secondary inclined faces 45 on each of two opposite sides thereof. On each side of the wedge 42, the primary inclined face 44 does not extend in a same plane with the secondary inclined faces 45 because of the inclined grooves 43. On each side of the wedge 42, the primary inclined face 44 extends between and parallel to the secondary inclined faces 45. The internal end element 40 further includes a countersink hole 41.

Referring to FIGS. 1, 2 and 4 to 7, the frictional element 60 includes an external end 64, an internal end (not numbered), a concave face 62, two primary slopes 63, four secondary slopes 68, two lateral faces 65, a tab 66, a cavity 67 and two arched grooves 69. The concave face 62, the primary slopes 63, the secondary slopes 68, the lateral faces 65, the tab 66 and the cavity 67 are made on or in a side of the frictional element 60. The arched grooves 69 are made in an opposite side of the frictional element 60.

For clarity of the following description, one of the primary slopes 63 is located next to the external end 64 and will be referred to as the "external primary slope 63" while the other primary slope 63 is located next to the internal end of the frictional element 60 and will be referred to as the "internal primary slope 63." Two of the secondary slopes 68 are in the vicinity of the external end 64 and will be referred to as the "external secondary slopes 68" while the other secondary slopes 68 are in the vicinity of the internal end of the frictional element 60 and will be referred to as the "internal secondary slopes 68." Each of the lateral faces 65 is located between a corresponding one of the internal secondary slopes 68 and a corresponding one of the external secondary slopes 68. The tab 66 is foimed on one of the lateral faces 65. The cavity 67 is made in the other lateral face 65. The concave face 62 is located between the lateral faces 65 in a transverse direction. The concave face 62 is located between the primary slopes 63 in a longitudinal direction.

The frictional element 70 includes an external end 74, an internal end (not numbered), a concave face 72, two primary slopes 73, four secondary slopes 78, two lateral faces 75, a tab 76, a cavity 77 and two arched grooves 79. The concave face 72, the primary slopes 73, the secondary slopes 78, the lateral faces 75, the tab 76 and the cavity 77 are made on or in a side of the frictional element 70. The arched grooves 79 are made in an opposite side of the frictional element 70.

For clarity of the following description, one of the primary slopes 73 is located next to the external end 74 and will be referred to as the "external primary slope 73" while the other primary slope 73 is located next to the internal end of the frictional element 70 and will be referred to as the "internal primary slope 73." Two of the secondary slopes 78 are in the vicinity of the external end 74 and will be referred to as the "external secondary slopes 78" while the other secondary slopes 78 are in the vicinity of the internal end of the frictional element 70 and will be referred to as the "internal secondary slopes 78." Each of the lateral faces 75 is located between a corresponding one of the internal secondary slopes 78 and a corresponding one of the external secondary slopes 78. The tab 76 is foimed on one of the lateral faces 75 while the cavity 77 is made in the other lateral face 75. The concave face 72 is located between the lateral faces 75 in a transverse direction. The concave face 72 is located between the primary slopes 73 in a longitudinal direction.

The frictional elements 60 and 70 are located next to each other. The tab 66 is movably inserted in the cavity 77 and the tab 76 is movably inserted in the cavity 67, thereby aligning the frictional elements 60 and 70 to each other and rendering them movable relative to each other in a transverse direction. Thus, the frictional elements 60 and 70 together foim an expansible tube with a tunnel made by and between the concave faces 62 and 72. The external secondary slopes 68 and 78 provide an external V-shaped notch. The internal secondary slopes 68 and 78 provide an internal V-shaped notch. Each of the arched grooves 69 and a corresponding one of the arched grooves 69 together provide an annular groove. A rubber band 50 is inserted in each of the annular grooves to elastically connect the frictional elements 60 and 70 to each other.

The wedge 35 of the external end element 31 is located at the external ends 64 and 74 of the frictional elements 60 and 70. The wedge 42 of the internal end element 40 is located at the internal ends of the frictional elements 60 and 70. The wedges 35 and 42 and the frictional elements 60 and 70 are interconnected by an adjustment unit 52. The adjustment unit 52 includes a threaded bolt 53 and a nut 54. The nut 54 is non-rotationally inserted in a countersink hole (not numbered) made in the internal end element 40. The threaded bolt 53 includes a head 55 inserted in the countersink hole 34 of the external end element 31. The remaining portion of the threaded bolt 53 is inserted in the tunnel of the expansible tube and the countersink hole 41 of the internal end element 40. The smaller end 35A of the wedge 35 is inserted in the external V-shaped notch of the expansible tube. The smaller end 42A of the wedge 42 is inserted in the internal V-shaped notch of the expansible tube.

Figure 2:
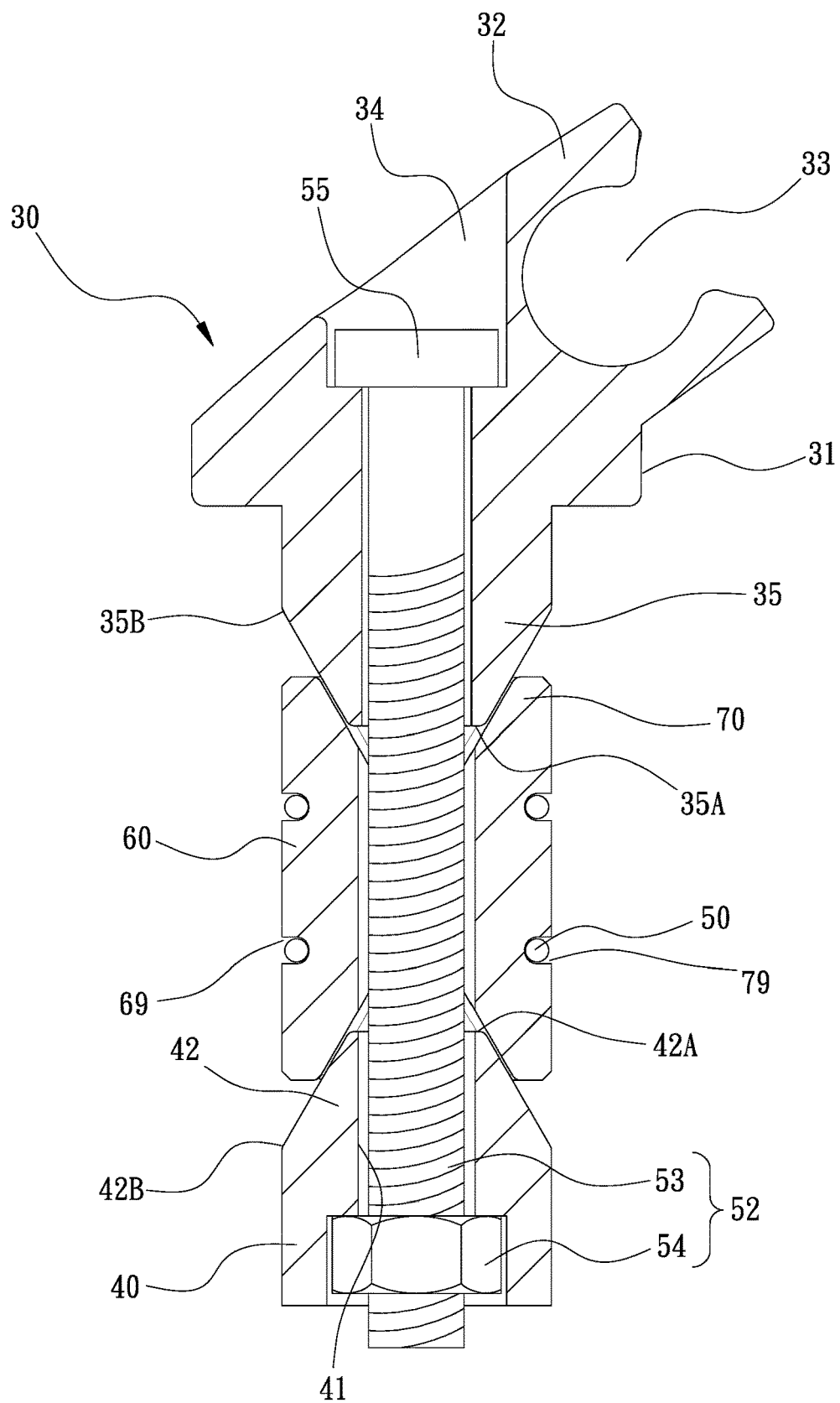
FIG. 2 is a cross-sectional view of the rear view mirror assembly shown in FIG. 1.
Figure 3:
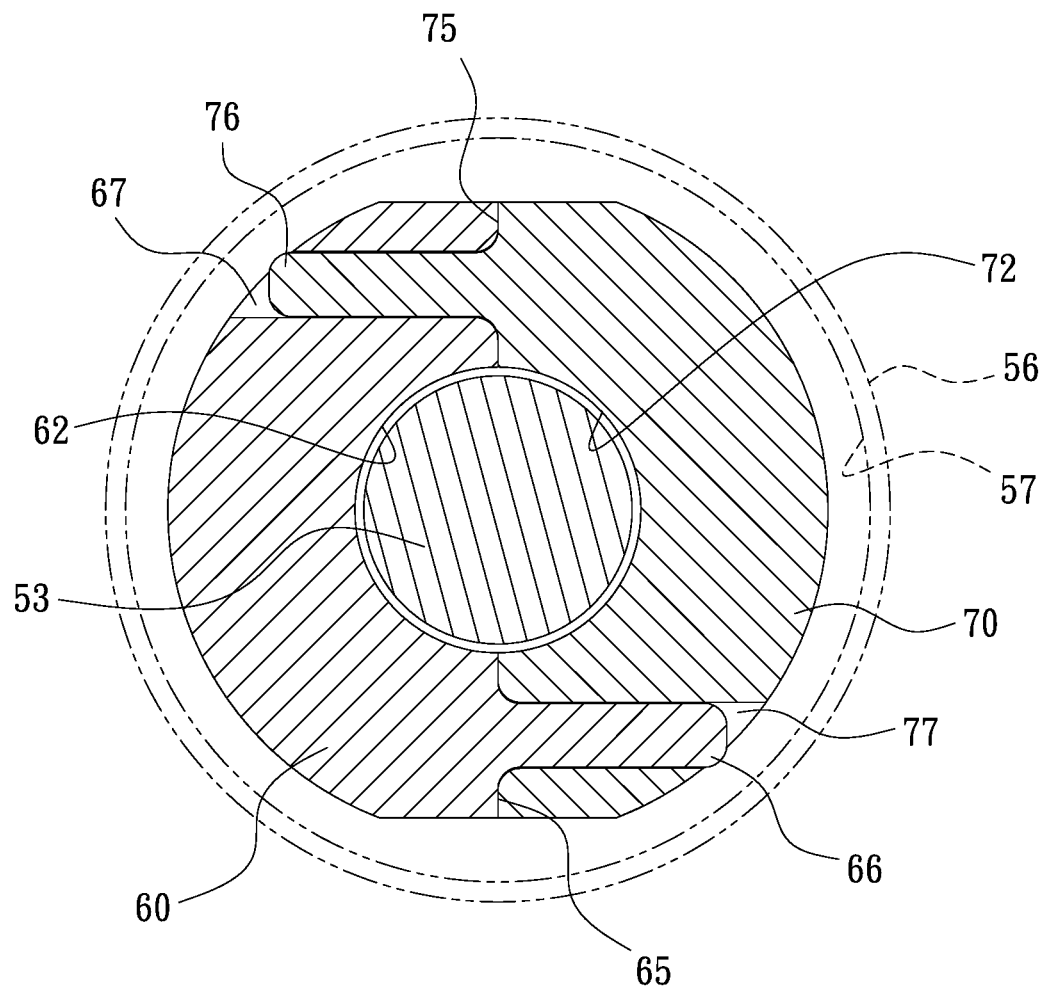
FIG. 3 is another cross-sectional view of the rear view mirror assembly shown in FIG. 2.

Referring to FIGS. 2 and 3, the threaded bolt 53 is rotated relative to the nut 54 in a first sense of direction to insert the plugging unit 30 in the handlebar 56. Thus, the wedge 35 is not in contact with the external ends 64 and 74 of the frictional elements 60 and 70 and the wedge 42 is not in contact with the internal ends of the frictional elements 60 and 70. That is, the primary inclined faces 37 are not in contact with the external primary slopes 63 and 73, and the primary inclined faces 44 are not in contact with the internal primary slopes 63 and 73. Moreover, the secondary inclined faces 36A are not in contact with the external secondary slopes 68 and 78, and the secondary inclined faces 45 are not in contact with the internal secondary slopes 68 and 78. Thus, the rubber bands 50 are allowed to shrink the expansible tube, thereby allowing easy insertion of the internal end element 40 and the expansible tube in the handlebar 56.

Figure 4:
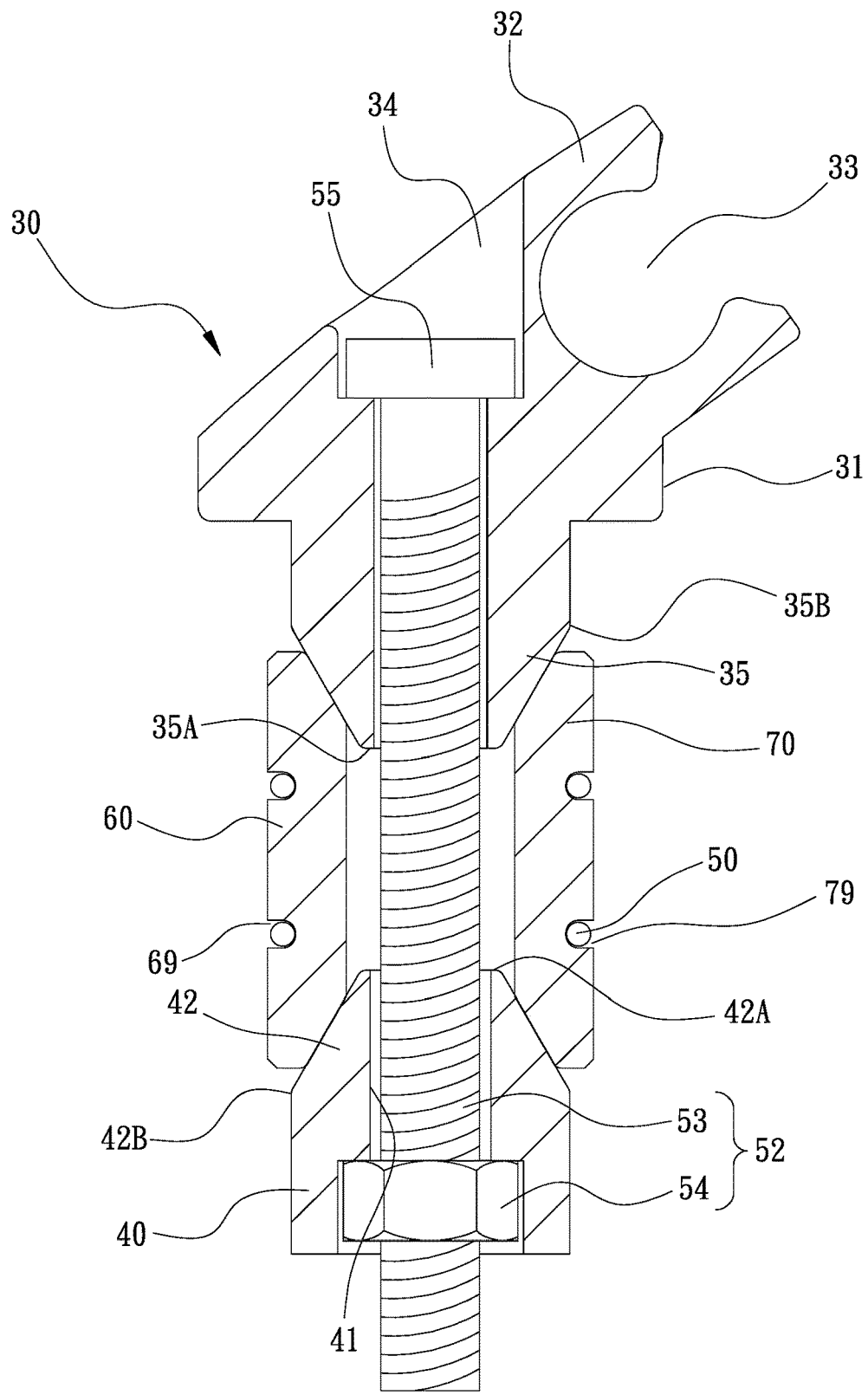
FIG. 4 is a cross-sectional view of the rear view mirror assembly in another position than shown in FIG. 2.
Figure 5:
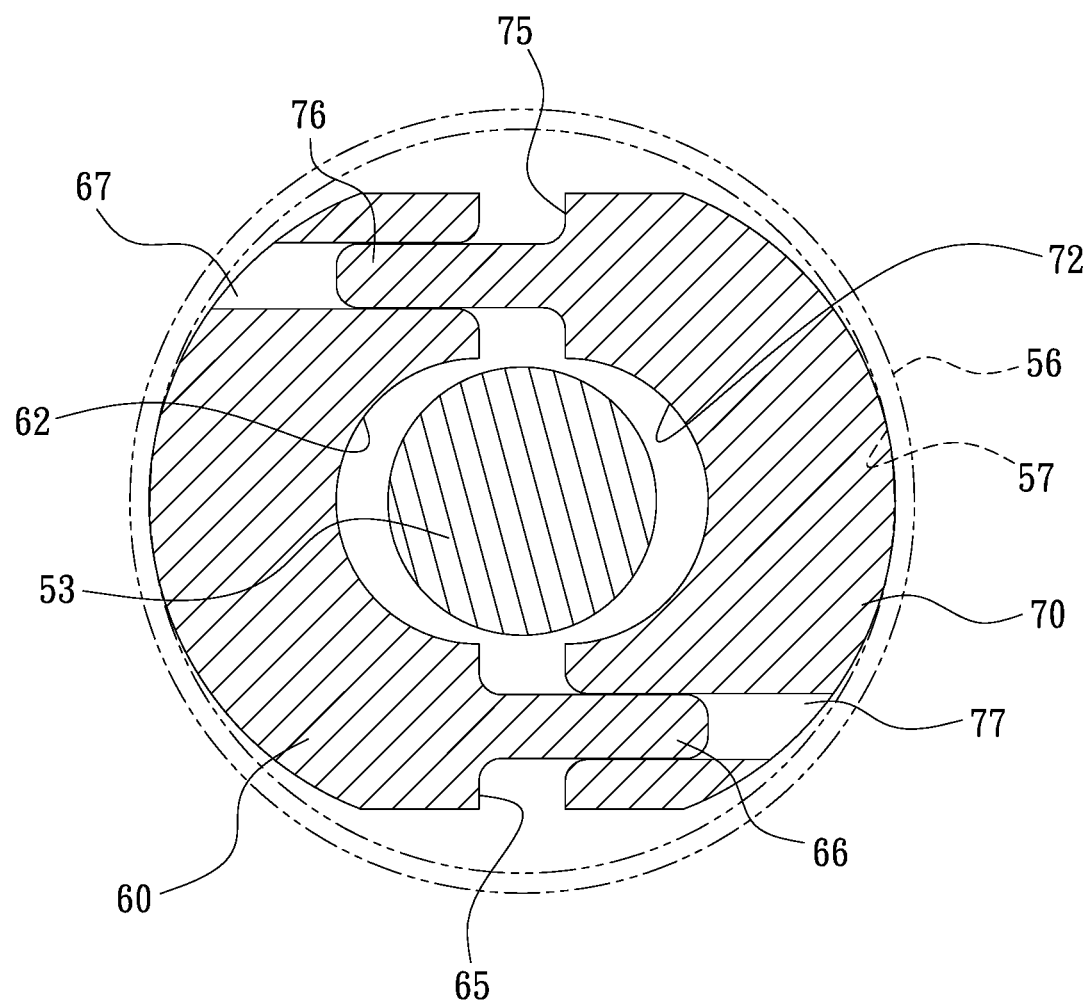
FIG. 5 is another cross-sectional view of the rear view mirror assembly shown in FIG. 4.
Figure 6:
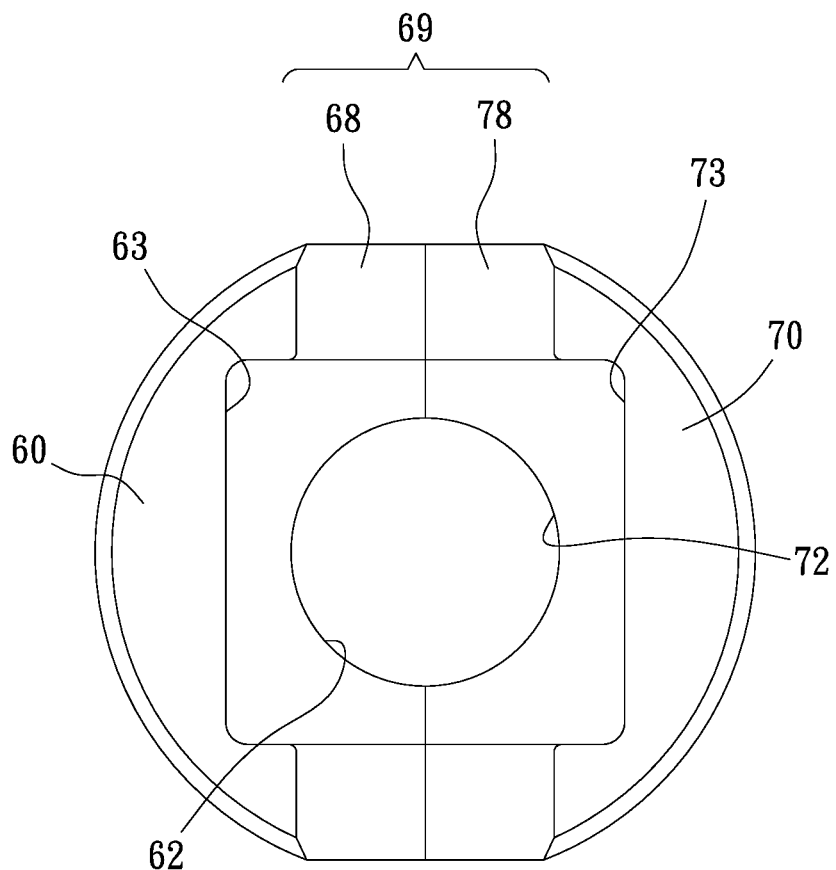
FIG. 6 is an end view of an expansible unit of the rear view mirror assembly shown in FIG. 1.
Figure 7:
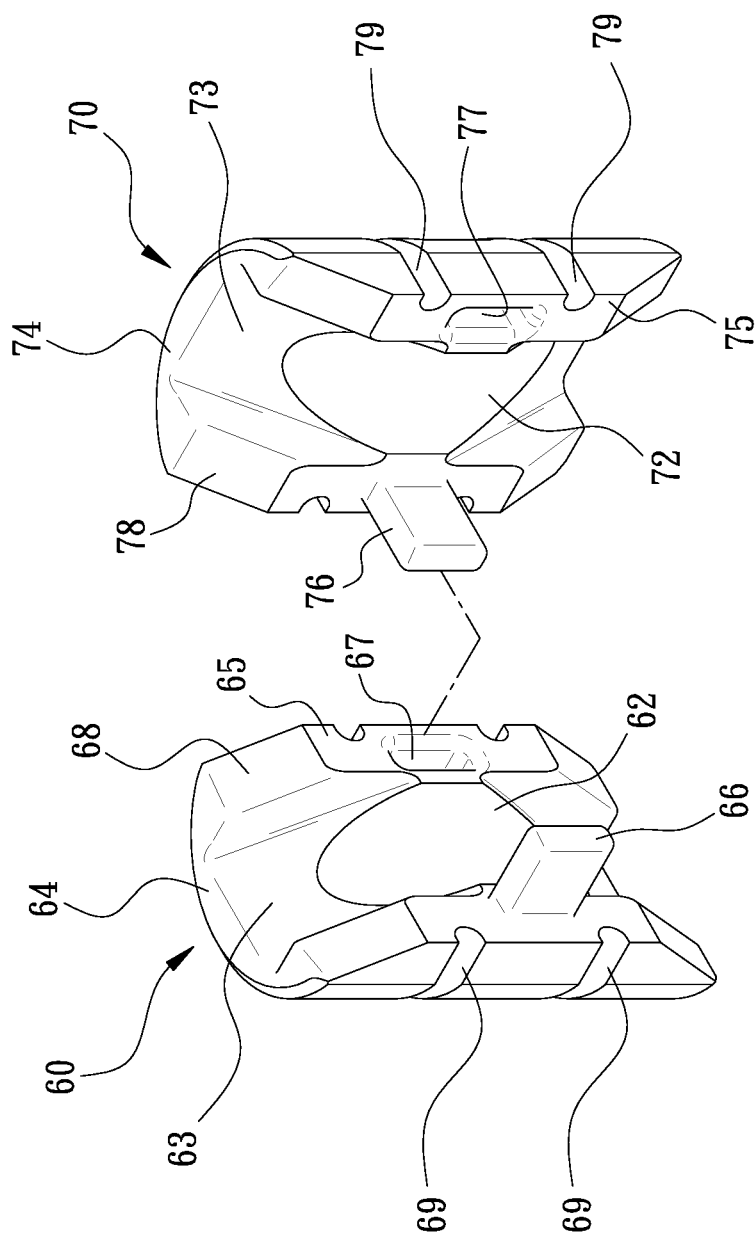
FIG. 7 is an exploded view of the expansible unit assembly shown in FIG. 1.
Figure 8:
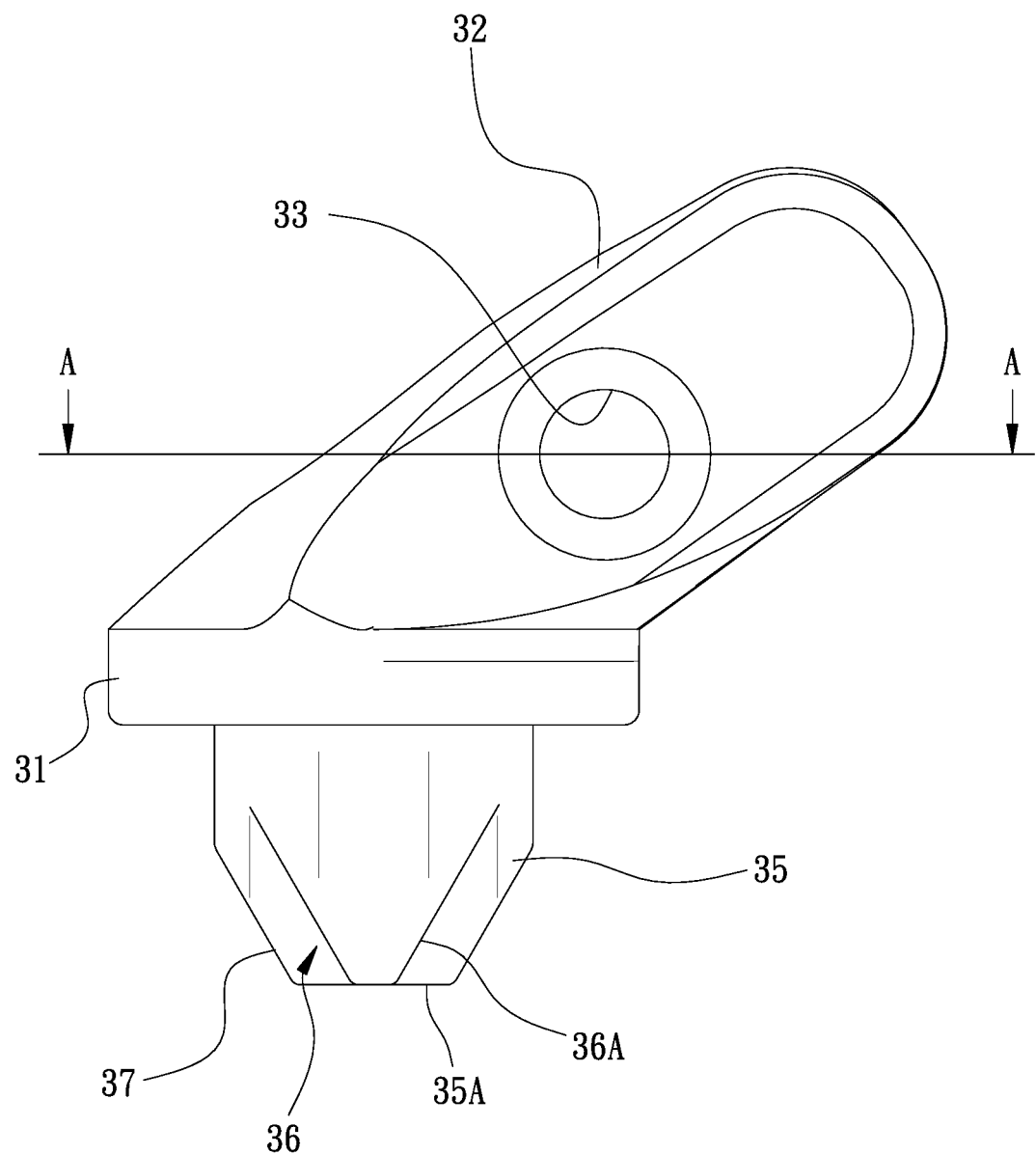
FIG. 8 is a left side view of a first end element of the expansible unit assembly shown in FIG. 1.
Figure 9:
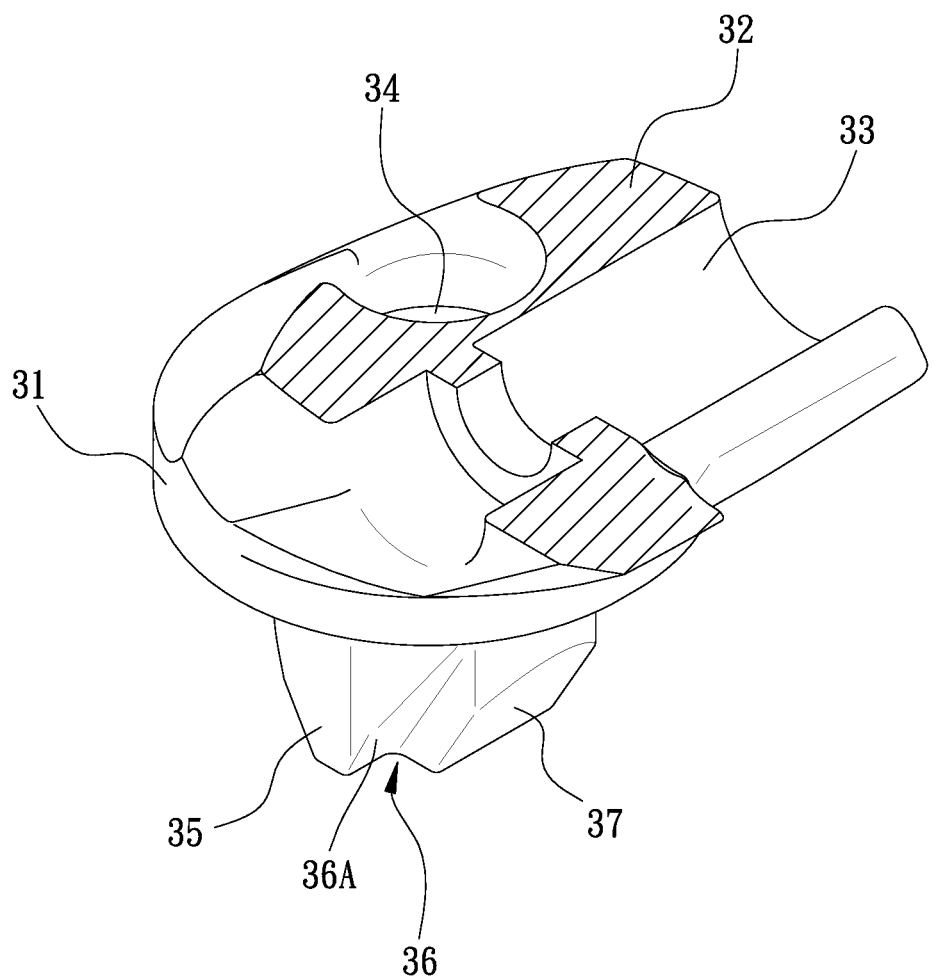
FIG. 9 is a cut-away view of the first end element shown in FIG. 8.
Figure 10:
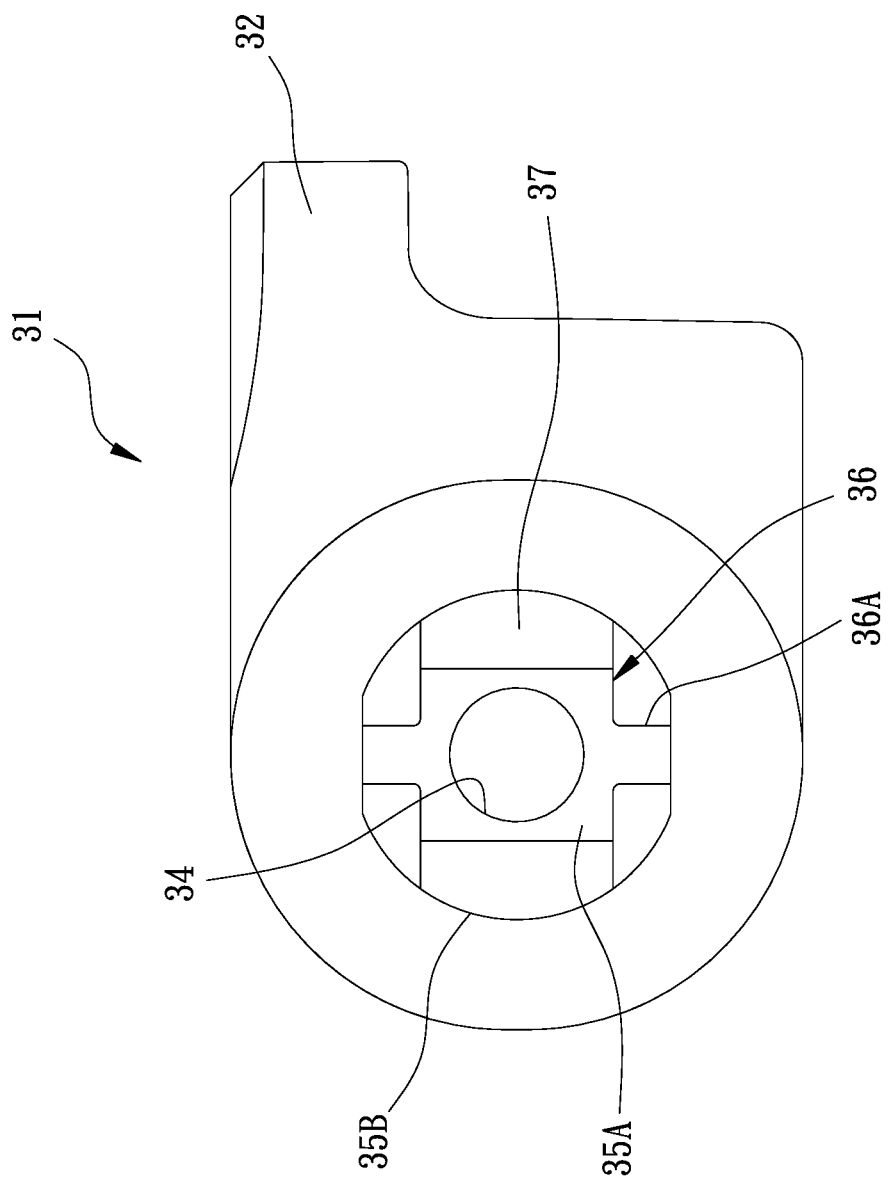
FIG. 10 is a top side view of the first end element shown in FIG. 8.
Figure 11:
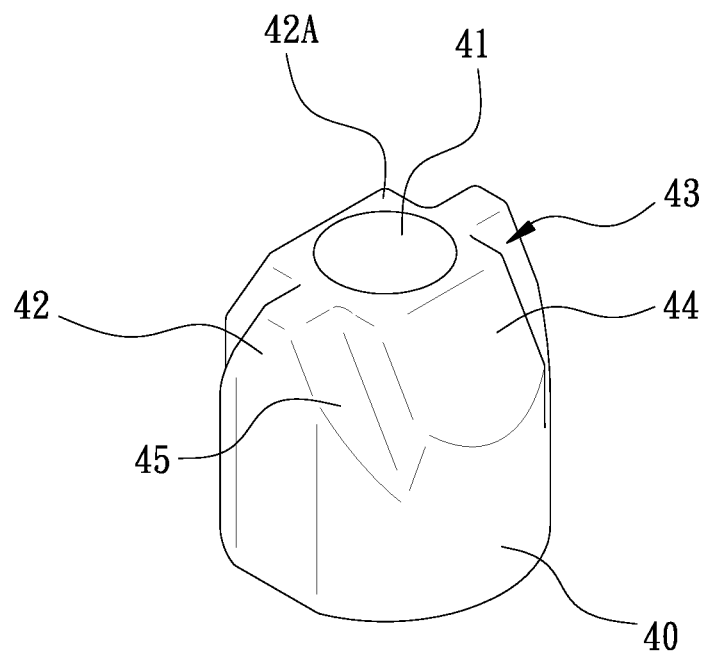
FIG. 11 is a perspective view of a second end element of the expansible unit assembly shown in FIG. 1.
Figure 12:
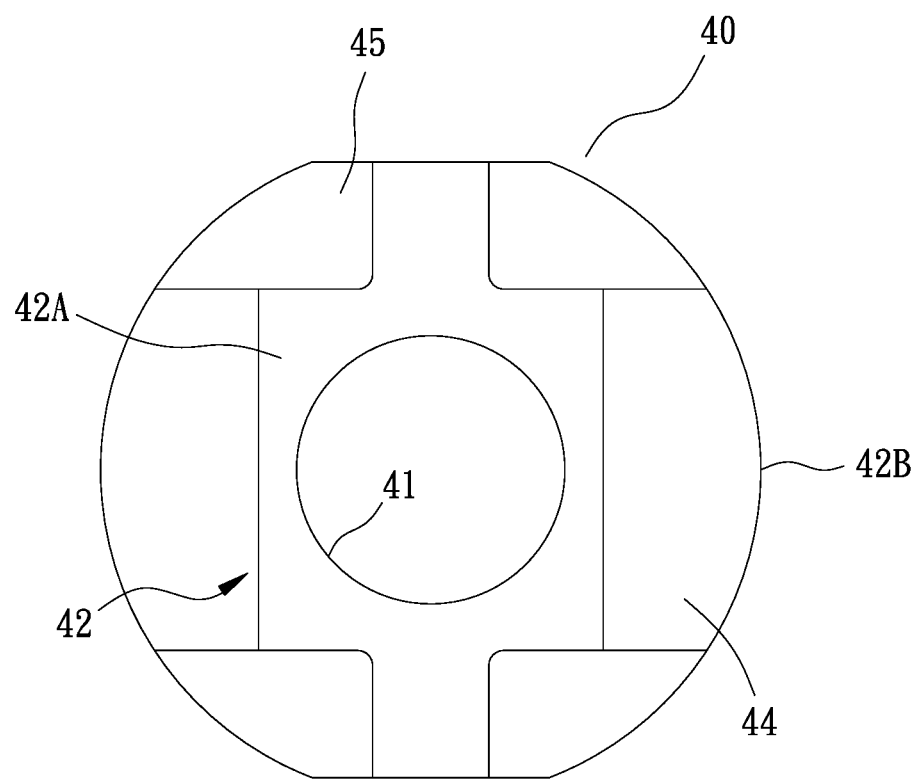
FIG. 12 is a bottom side view of the second end element depicted in FIG. 11.
Figure 13:
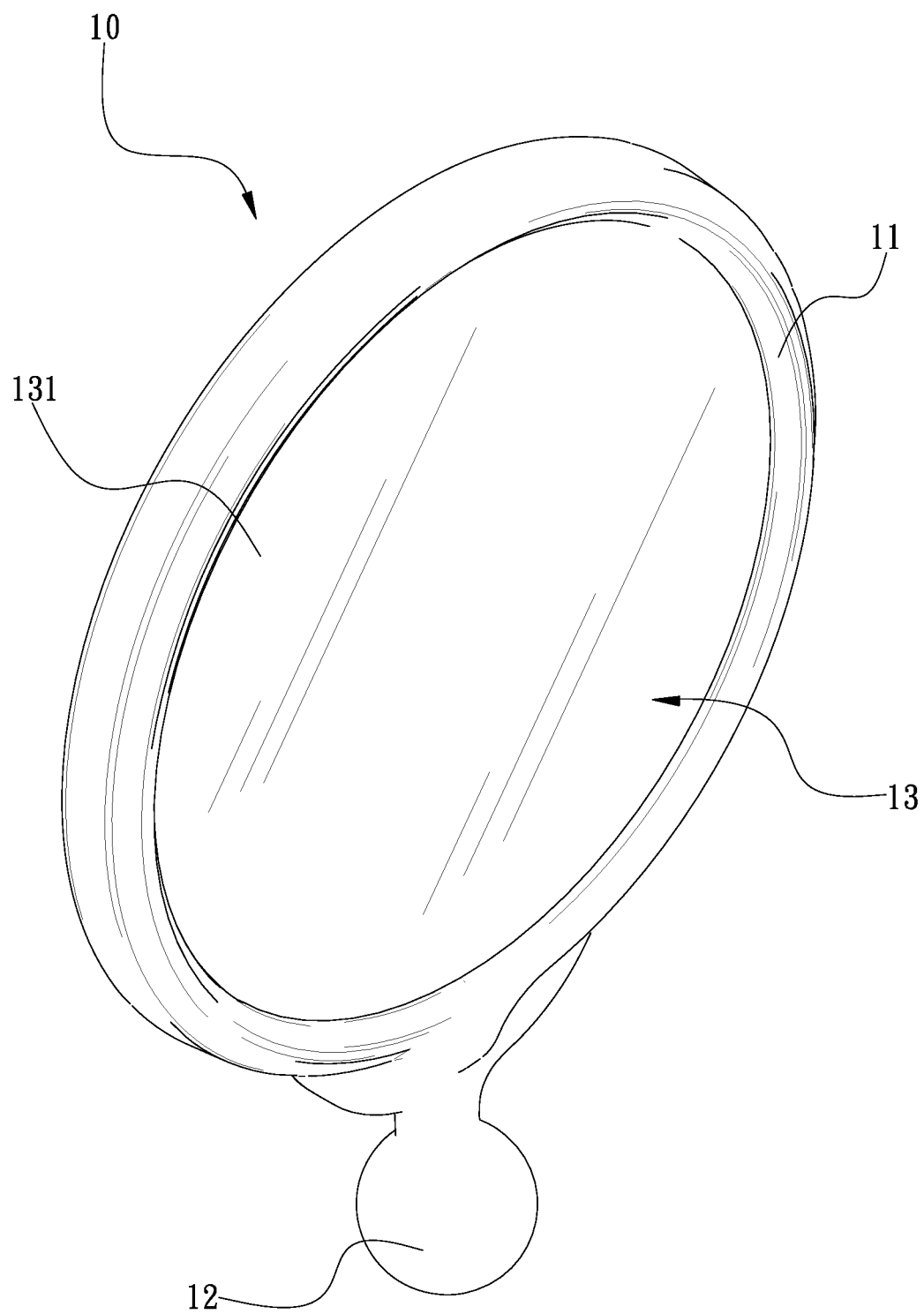
FIG. 13 is a perspective view of a mirror unit of the side view mirror assembly shown in FIG. 1.
Figure 14:
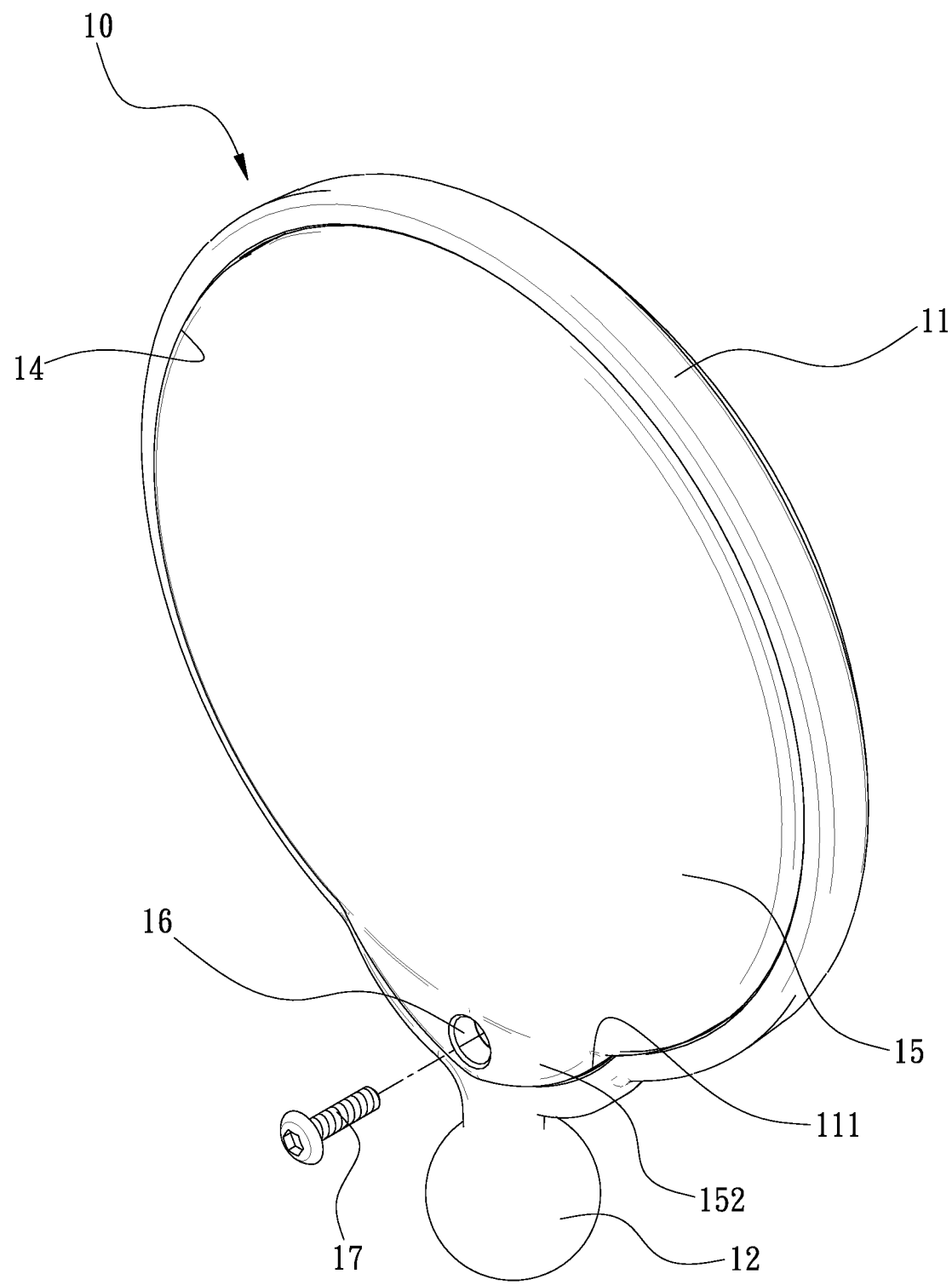
FIG. 14 is a perspective view of the mirror unit shown in FIG. 13.
Figure 15:
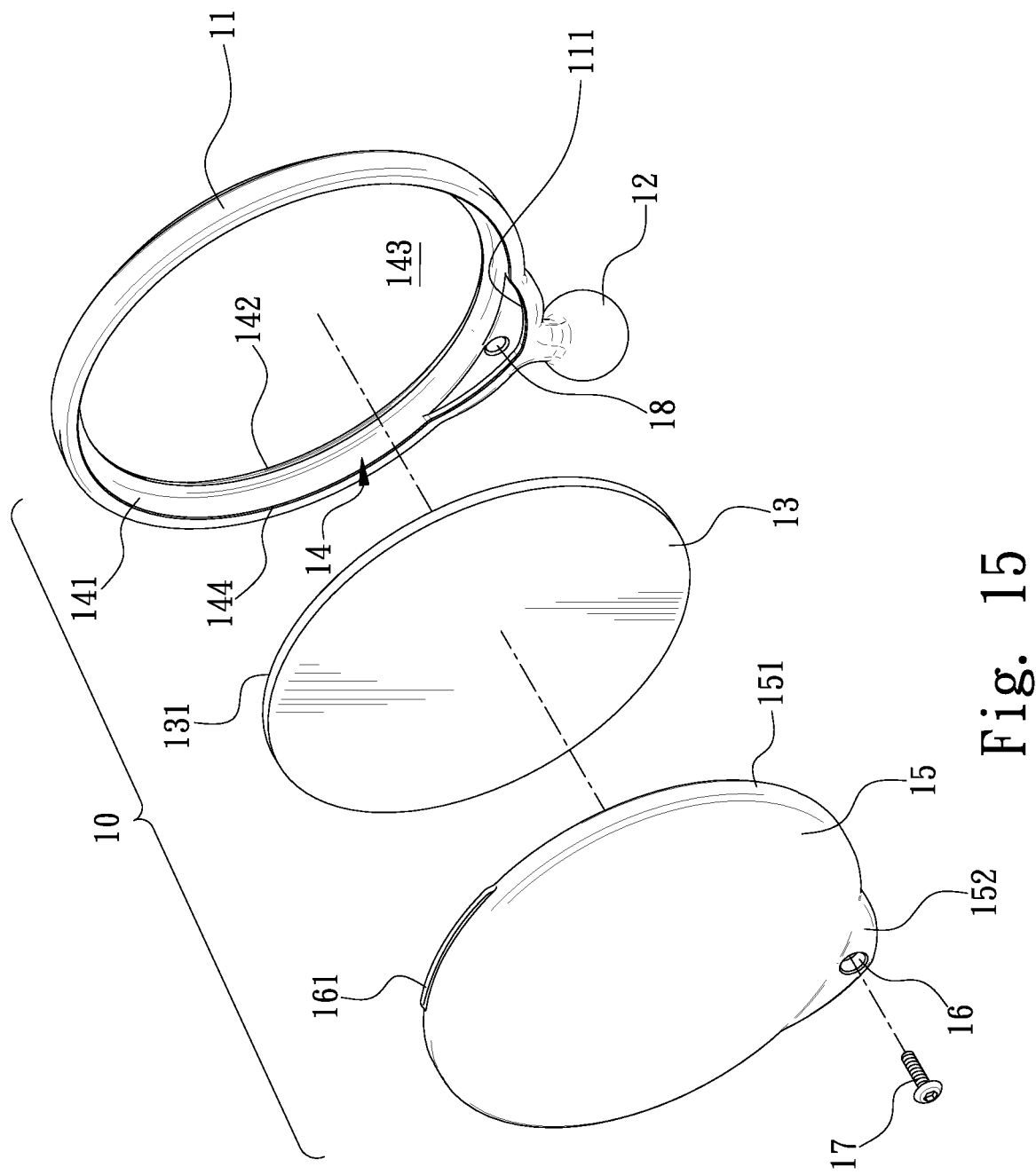
FIG. 15 is an exploded view of the mirror unit shown in FIG. 14.
Figure 16:
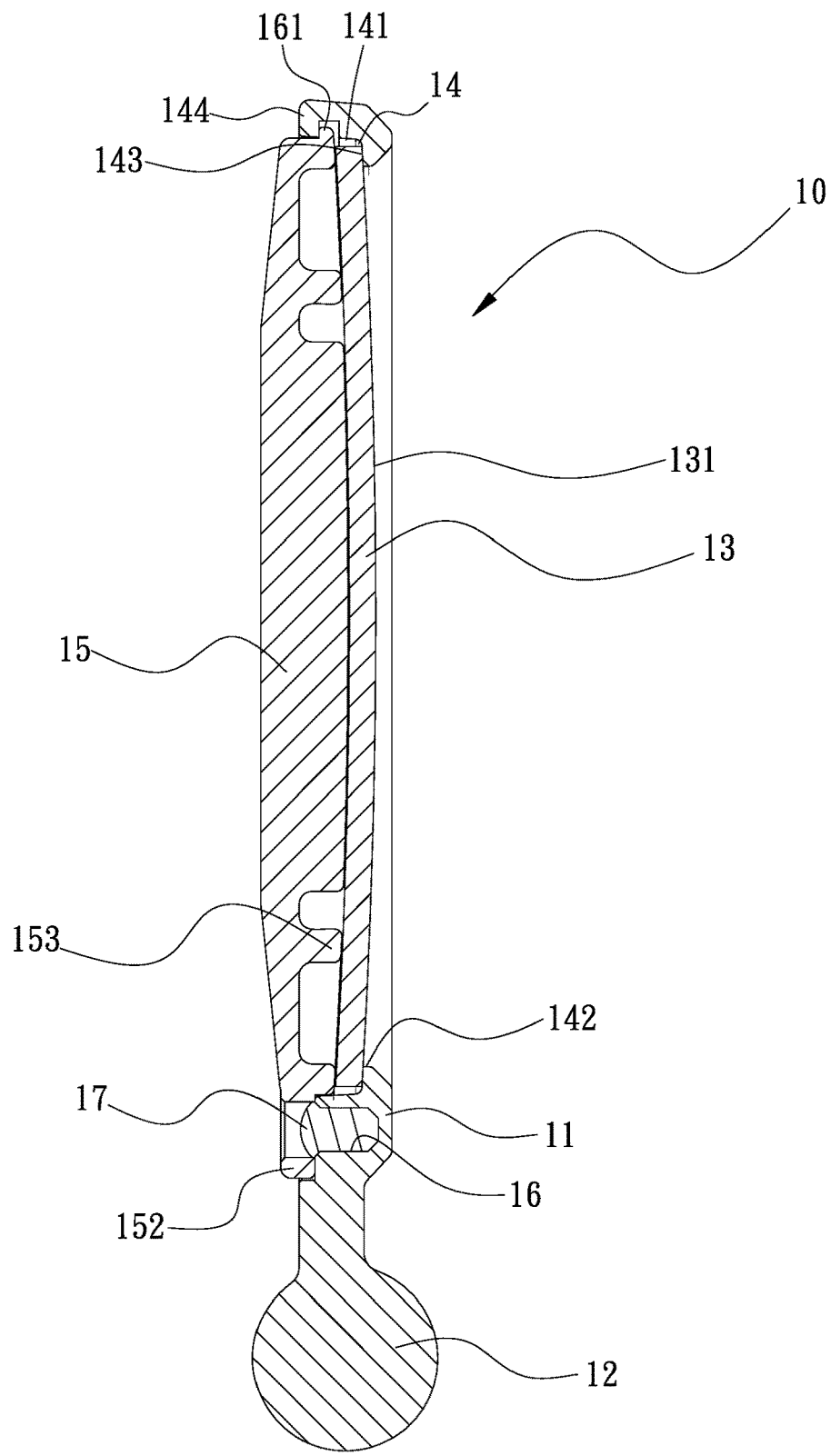
FIG. 16 is a cross-sectional view of the mirror unit shown in FIG. 13.

Referring to FIGS. 4 and 5, the threaded bolt 53 is rotated relative to the nut 54 in a second sense of direction once the internal end element 40 and the expansible tube are inserted in the handlebar 56. Thus, the wedge 35 is abutted against the external ends 64 and 74 of the frictional elements 60 and 70 and the wedge 42 is abutted against the lower ends of the frictional elements 60 and 70. That is, the primary inclined faces 37 are abutted against the external primary slopes 63 and 73, and the primary inclined faces 44 are abutted against the internal primary slopes 63 and 73. Moreover, the secondary inclined faces 36A are abutted against the external secondary slopes 68 and 78, and the secondary inclined faces 45 are abutted against the internal secondary slopes 68 and 78. Thus, the expansible tube is expanded and abutted against an internal face 57 of the handlebar 56 so that the expansible tube is kept in the handlebar 56. Hence, the plugging unit 30 is firmly connected to the handlebar 56. That is, the side mirror assembly is kept on the handlebar 56.

To detach the side view mirror from the handlebar 56, the threaded bolt 53 is rotated relative to the nut 54 in the first sense of direction to allow the rubber bands 50 to shrink the expansible tube as discussed above. Then, the internal end element 40 and the expansible tube can easily be moved out of the handlebar 56. That is, the side view mirror is detached from the handlebar 56.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A mirror unit comprising:
   a screw;

a frame comprising a rear annular flange formed thereon, an opening and a front annular flange extending around the opening and comprising a screw hole for receiving the screw;

a mirror abutted against the annular flange and visible via the opening; and a plate attached to the frame in a detachable manner, thereby keeping the mirror in the frame, wherein the plate comprises:

a countersink hole for receiving a head of the screw; and an arched fin formed with a rear face adapted for abutment against a front face of the rear annular flange.

2. The mirror unit according to claim 1, wherein the rear annular flange comprises a recess through which the screw is inserted in the screw hole.

3. The mirror unit according to claim 2, wherein the plate comprises a lobe formed at an edge and inserted in the recess.

4. The mirror unit according to claim 3, wherein the countersink hole is made in the lobe.

5. The mirror unit according to claim 1, further comprising at least two screws inserted in the front annular flange and the plate and at least two nuts engaged with the screws.

6. The mirror unit according to claim 1, wherein the front annular flange comprises at least two countersink holes each of which receives a head of a corresponding one of the screws, wherein the plate comprises at least two countersink holes each of which receives a corresponding one of the nuts.

7. The mirror unit according to claim 1, wherein one of the frame and the plate comprises a ball for rotational insertion in a socket.

8. A plugging unit comprising:
an external end element comprising a wedge;
an internal end element comprising a wedge;
an expansible tube comprising two frictional elements movably connected to each other, wherein each of the frictional elements comprises a concave face, and the concave face make a tunnel in the expansible tube when the frictional elements are interconnected;
a nut inserted in the internal end element; and
a threaded bolt inserted in the external end element, the expansible tube and the internal end element and engaged with the nut, wherein the threaded bolt is rotatable in a first sense of direction to remove the wedges from the expansible tube to allow the expansible tube to shrink to render the expansible tube easily insertable in a handlebar, wherein the threaded bolt is rotatable in a second sense of direction to cause the wedges to abut against and expand the expansible tube to keep the expansible tube tightly in the handlebar.

9. The plugging unit according to claim 8, wherein each of the frictional element further comprises two lateral faces on two opposite sides of the concave face, a tab formed on one of the lateral faces, and a cavity made in the other lateral face, wherein the tab of each of the frictional elements is movably inserted in the cavity of the other frictional element.

10. The plugging unit according to claim 9, wherein the wedge of each of the external and internal end elements comprises a primary inclined face, wherein each of the frictional elements comprises an external primary slope along which the primary inclined face of the wedge of the external end element is movable and an internal primary slope along which the primary inclined face of the wedge of the internal end element is movable.

11. The plugging unit according to claim 10, wherein the wedges of each of the external and internal end elements comprises two secondary inclined faces on two opposite sides of the primary inclined face thereof, wherein each of the frictional elements further comprises two external secondary slopes along which the secondary inclined faces of the wedge of the external end element are movable and two internal secondary slopes along which the internal secondary inclined faces of the wedge of the internal end element are movable.

12. The plugging unit according to claim 8, further comprising at least one rubber band extending around the frictional elements so that the rubber band tends to shrink the expansible tube.

13. A plugging unit comprising:
an external end element comprising a wedge;
an internal end element comprising a wedge;
an expansible tube comprising two frictional elements movably connected to each other, wherein each of the frictional elements comprises at least one arched groove for receiving a section of the rubber band;
a nut inserted in the internal end element; and
a threaded bolt inserted in the external end element, the expansible tube and the internal end element and engaged with the nut, wherein the threaded bolt is rotatable in a first sense of direction to remove the wedges from the expansible tube to allow the expansible tube to shrink to render the expansible tube easily insertable in a handlebar, wherein the threaded bolt is rotatable in a second sense of direction to cause the wedges to abut against and expand the expansible tube to keep the expansible tube tightly in the handlebar.

* * * * *